Dec. 17, 1929.    W. REBIKOFF    1,740,315
PLANET GEAR DRIVE FOR ELECTROMECHANICAL PHONOGRAPHS
Filed July 16, 1928
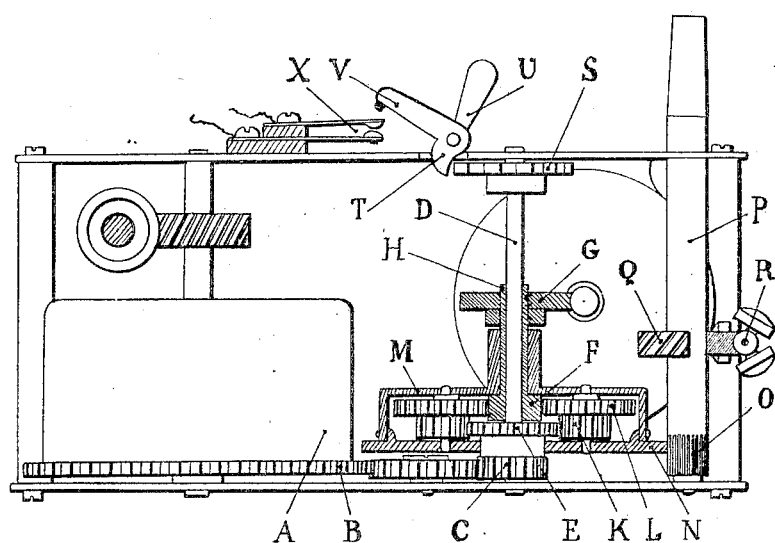
W. Rebikoff
INVENTOR
By: Marks & Clark
Attys.

Patented Dec. 17, 1929

1,740,315

UNITED STATES PATENT OFFICE

WASSILY REBIKOFF, OF PARIS, FRANCE, ASSIGNOR TO LÉONIDE DAVYDOFF, OF PARIS, FRANCE

PLANET-GEAR DRIVE FOR ELECTROMECHANICAL PHONOGRAPHS

Application filed July 16, 1928, Serial No. 293,019, and in France September 10, 1927.

In electro-mechanical phonographs or talking machines, provided with both an electrical and a spring motor for their actuation, clutches or couplings are usually provided for allowing, at will, the connection of either motor with the vertical turntable spindle.

The object of my invention is an arrangement allowing the turntable spindle to be actuated through the spring or through the electric motor without the use of any clutches or other coupling devices, both motors being constantly connected with the turntable spindle through suitable gearing, whereby the mere stopping of one motor allows the other to work.

My invention is based on the use of a differential gear or epicyclic train usually termed a planet gear, connecting together the electric motor, the spring motor and the turntable spindle.

I have shown, by way of example, on appended drawings a diagrammatical view of a planet gear connecting both motors with the turntable spindle according to my invention.

The wheel B of the spring motor A is in direct or indirect gear relation with the pinion C of the spindle D to which is secured the large central pinion E of the planet gear.

The small central pinion F of the arrangement is secured to the tubular shaft H to which is also secured the wormwheel G in gear with a worm on the shaft of the electric motor.

The shaft of the planet pinions K and L is borne by the plates forming the sides of the drum M, which may revolve freely round the spindle D and the shaft H and has fixed to it a spurwheel N meshing with the pinion O of the turntable spindle P which latter drives the worm of the centrifugal regulator R through the wormwheel Q.

The spindle D has secured thereto a ratchet wheel S which can be stopped by the pawl T borne by the lever V actuating the switch X and controlled by the handle U.

When the handle U is pushed towards the left, the pawl T will stop the wheel S and the pinions C and E and thereby the spring motor; at the same time the switch X closes the circuit and allows the electric motor to rotate and to drive the small central pinion F of the planet gear. The motion is transmitted to the turntable spindle through the wheel N of the drum M, the said motion being braked by the action of the pinions K and L. When the handle U is pushed towards the right the circuit will be broken, the electric motor stopped, the wheel S released and the spring motor allowed to start operation. The small central pinion F and the electric motor being at rest, the motion of the pinions E and C is transmitted to the turntable spindle by the wheel N and the speed may be increased according to the gear relation between the pinions of the planet gear.

What I claim is:

1. A combined electromechanical control device for phonographs comprising an electric motor, a feed circuit therefor, a spring motor, two coaxial independent shafts adapted to be driven in opposite directions at a predetermined speed respectively by the electric motor and by the spring motor, the turntable spindle of the phonograph, a planet gear the main pinions of which are keyed to the coaxial shafts respectively and the casing of which drives the turntable shaft and means for automatically preventing the movement of the spring motor from acting on the corresponding shaft when the electric motor is normally operative.

2. A combined electromechanical control device for phonographs comprising an electric motor, a feed circuit therefor, a spring motor, two coaxial independent shafts adapted to be driven in opposite directions at a predetermined speed respectively by the electric motor and by the spring motor, the turntable spindle of the phonograph, a planet gear the main pinions of which are keyed to the coaxial shafts respectively and the casing of which drives the turntable shaft, means for simultaneously closing the circuit of the electric motor and locking the shaft adapted to be driven by the spring motor against rotation.

In testimony whereof I have affixed my signature.

WASSILY REBIKOFF.